Sept. 7, 1948.  D. E. GAMBLE  2,448,880
FRICTION CLUTCH PLATE
Original Filed June 12, 1937
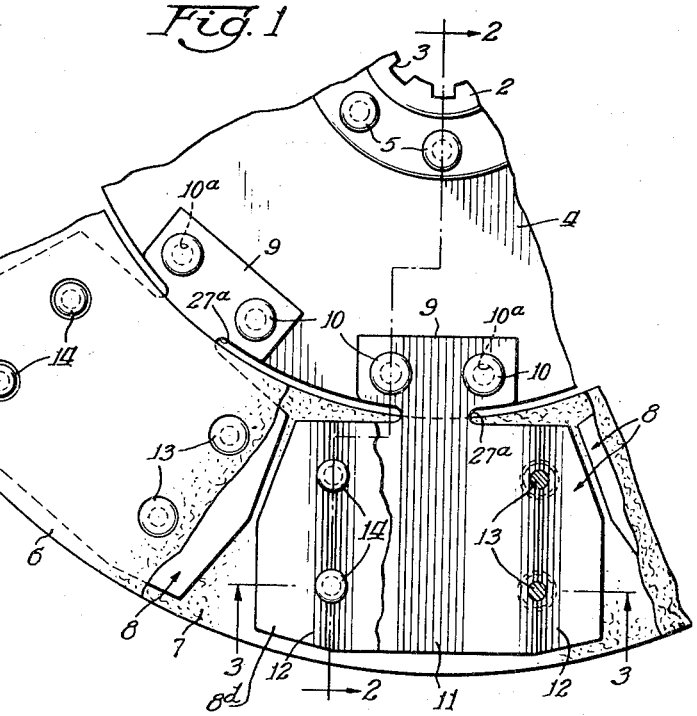
Fig. 1
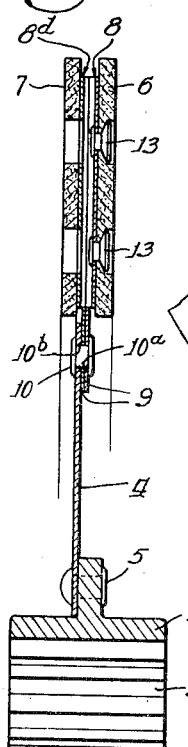
Fig. 2
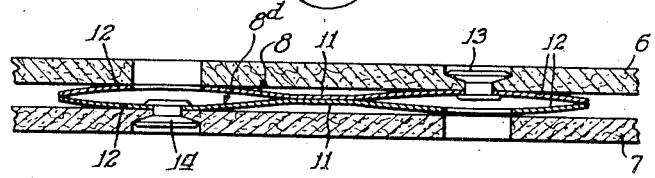
Fig. 3
Fig. 4
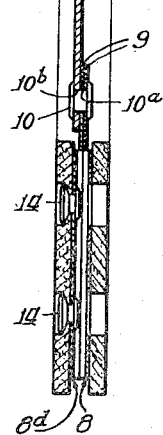
Inventor:
David E. Gamble
By: Edward C. Fitzhugh
Atty.

Patented Sept. 7, 1948

2,448,880

UNITED STATES PATENT OFFICE 2,448,880

FRICTION CLUTCH PLATE

David E. Gamble, Tucson, Ariz., assignor to Borg-Warner Corporation, Chicago, Ill., a corporation of Illinois Original application June 12, 1937, Serial No. 147,936. Divided and this application April 21, 1948, Serial No. 22,342

7 Claims. (Cl. 192—107)

My invention relates to improvements in friction clutch plates, and more particularly to clutch plates of the so-called "cushion" type comprising the driven assembly of a friction clutch.

This application is a division of my copending application Serial No. 147,936, filed June 12, 1937, for Friction clutch plate.

It has become a practice in the art of friction clutches to construct the driven assembly, or friction clutch plate, in such manner as to support the friction facings thereof yieldingly upon the relatively rigid hub-disc assembly of the plate, thus to permit the friction facing supports to yield during compression of the plate in such manner that the friction facings, without undergoing change in shape, may adjust themselves to the friction engaging surfaces of the clutch drive assembly. In my earlier U. S. Letters Patent Nos. 1,652,005-6-7, I have disclosed clutch plates of the above-described type in which the outer regions of the clutch discs are fashioned to provide a plurality of relatively yielding cushions upon which the friction facings are supported. During compression of the plate such facings were capable of moving bodily, without distortion, relatively toward one another.

Later, clutch plates were constructed and adapted to commercial use in which independent relatively light steel spring cushions were mounted upon the outer side wall of the clutch disc, and in turn supported at least one of the friction facings. Such plates possessed the advantage of providing any desired resistance to facing movement during compression of the plate by the simple expedient of choosing, at the time of manufacture, cushions of proper resiliency, both disc and cushions being formed from but two dies.

Such clutch plates as I have described, however, because the relatively heavy metal of the clutch disc extended to the outer periphery of the finished plate, possess what I choose to call relatively high "spinning inertia." Stated in other words, the relatively high rotating mass of the peripheral portion of the plate brought about a delay in the shifting of transmission gears, as from one speed through neutral to another speed, because the "spinning inertia" of the plate with the clutch disengaged caused the plate with the relatively moving parts of the transmission to decelerate slowly and to delay synchronism of the engageable transmission gears. This objection was particularly noticeable before the introduction of synchromesh transmissions.

It is an object of my present invention, therefore, to provide an improved clutch plate having all the advantages of the independent steel spring cushion plate as to preselection of cushion resistance, and in addition thereto, to provide a plate which possesses a relatively low "spinning inertia" so that the plate may decelerate quickly, thus to facilitate the quickening of transmission gear shift.

Another object of my invention is to provide an improved friction clutch plate in which the friction facings and their cushion supporting instrumentality is such as to provide for bodily movement of the two friction facings, one relatively to the other, and both relative to the disc.

These features are ones which assure complete surface to surface engagement between the facings and their friction engaging surfaces of the driving assembly, as well as the correction of slight misalignment between the plane of the body of the disc and the plane of rotation of the driving assembly.

Another object is to provide an improved friction clutch plate which is simple in construction, and which may be manufactured at a relatively low cost.

Another object of the invention is to provide an improved friction clutch plate in which the spinning inertia is greatly reduced as compared to prior plates, without sacrificing torsional load carrying capacity. To this end, the invention contemplates a friction clutch plate including a hub, a mounting disc mounted on said hub, comprising a substantially circular central disc portion of sheet metal of such thickness as to be substantially unyielding and to adequately withstand the torque loads imposed upon it during clutch operation, and a peripheral region having a low rotational inertia, said peripheral region comprising a plurality of yieldable cushion members of materially lesser thickness and weight per unit area than said disc portion, spaced from the periphery of said disc portion, neck members, of reduced circumferential width compared to that of said cushion members, joining said cushion members to the disc portion, and friction facings embracing and secured to said cushion members.

Other objects, advantages and uses of the invention will be apparent after reading the following specification and claims, and after consideration of the drawings forming a part of the specification, in which:

Fig. 1 is a fragmentary face elevation of a clutch plate constructed in accordance with my invention;

Fig. 2 is a cross sectional view substantially along the line 2—2 of Fig. 1;

Fig. 3 is a sectional view along the line 3—3 of Fig. 1; and

Fig. 4 is a view similar to Fig. 3 of a modified form of the cushion.

With reference to Figs. 1 to 3, inclusive, I have illustrated therein a friction clutch plate of the type intended for use in the friction clutch, or so-called "engine clutch" of a motor vehicle.

The clutch plate illustrated may comprise a hub 2, having splines 3 for engagement with the complementarily splined portion of a transmission shaft (not shown), a circular mounting plate 4 of sheet steel secured, as by rivets 5, to the hub 2 and of an outside diameter notably less than the overall diameter of the complete clutch plate and annular friction facings, of which there are two in number and indicated at 6 and 7 respectively, preferably of an internal diameter greater than the outer diameter of the disc 4. The facings 6 and 7, it will be noted, are located concentrically of the disc 4 in parallel relationship to one another and to the plane of the body of the disc 4.

Each of the facings 6 and 7 are drivingly connected with the hub and disc assembly 2—4 through the medium of a plurality of sets of resilient cushions 8 and 8ª, respectively, arranged in pairs in annular array about the axis of the hub 2, each pair of cushions in close end to end relationship with the next adjacent pair (see Fig. 1). The resilient cushions 8 constitute one set or row of cushions and the resilient cushions 8$^d$ constitute another set or row, with the cushions of one row being axially offset and cooperating with the cushions of the other row to provide for relative axial movement of the friction facings under clutch packing pressure.

Each of the cushions 8 and 8$^d$ is of general T-shaped configuration and is formed with an integral tab or foot 9 at its radially inward edge, the tab 9 being connected to the horizontally extending head or cushion portion by a narrow neck portion 27ª of substantially less circumferential width than either the cushion portion or the tab 9. The tabs 9 of each pair of cushions 8 and 8$^d$ are secured firmly by rivets 10 to the peripheral portion of the disc 4, both tabs 9 being located preferably on one side of the disc and the rivets 10 extend through suitable openings 10ª and 10$^b$ in the tabs and disc, respectively. The centers of the openings 10ª and 10$^b$ lie upon radii disposed on either side of the neck portion 27ª. With reference to Fig. 3, each of the cushions are formed with their central portions flat, as indicated at 11, and with their circumferentially extending end portions, or wings, bowed, as indicated at 12, in such manner that the concave sides of the bowed wing portions face each other and the facings 6 and 7 may rest directly upon the convex sides or crowns of the bowed cushion portions, the intermediate and flat portions 11 of the cushions being in contact with one another and in spaced relationship to the adjacent surfaces of each of the friction facings (see Fig. 3). The facing 6 may be secured to each of one of the cushions 8 by rivets 13 which extend through the facing 6 and through one of the bowed portions 12, and the facing 7 may be secured to each one of the cushions 8$^d$ by similar rivets 14 extending through the facing 7 and through that one of the bowed portions 12 which is diagonally out of register with the adjacent rivet 13, as viewed in Fig. 3. The attachment of the cushions 8 and 8$^d$ to their associated facings 6 and 7, in this manner, maintains the facings in substantially parallel relation, free from axial distortion.

A clutch plate constructed as herein described presents yielding resistance to bodily movement of the facings relatively toward one another, such resistance being provided by the bowed portions of the pairs of cushions 8 and 8$^d$. Should slight misalignment demand bodily and collective movement of the facings relatively to the disc 4, such movement or accommodation may take place, although in a properly constructed clutch plate and clutch driving assembly, such error in alignment does not frequently occur. During clutch engagement, the cushions may spread out circumferentially. This advantage, which is the result of the arrangement of the rivets 13 and 14 relative to the cushions, prevents any internal stresses within the cushion members which might otherwise impair efficient cushion operation, and which in time might result in mutilation of the cushions.

My improved clutch plate possesses relatively high torque transmitting characteristics, since each of the cushion members is secured firmly to one of the facings, and each cushion member is firmly fixed by a plurality of rivets 10 to the disc 4. There is no tendency of the cushions to yield circumferentially, since the torque transmitted between facing and hub assembly is transmitted edgewise substantially through the plane of the bodies of the cushions, and this is particularly so during complete engagement of the clutch when the cushions are compressed to their reasonable operative limit.

The major advantage attained by the clutch plate herein described is the presentation of low "spinning inertia," since the mass of the relatively thin steel cushions 8 and 8$^d$ is considerably less than would be the mass of the disc 4 were it extended to the outer periphery of the plate, or were the cushion members substituted for structurally distorted portions of the disc 4 as has been the practice in times past prior to the use of independent spring steel cushions in a manner I have previously described.

The reduction in "spinning inertia" in my improved clutch plate is one that is very noticeable by the increase in rate of deceleration of the clutch plate and transmission drive shaft assembly. This reduction is of such order that shifting of the gears from one speed through neutral to another may take place in noticeably less time without clashing than is possible in clutch plates of typical present construction.

At the same time, the construction and arrangement of the parts is such that the plate has ample torsional load carrying strength. Considering the disc 4 and the cushions 8, 8$^d$ etc., collectively as a mounting plate, the peripheral region of which comprises relatively light thin cushions, it may be pointed out that the torsional load becomes concentrated toward the center of the plate, and the central disc portion thereof is accordingly made relatively heavy and unyielding so as to withstand such concentrated torque loads. The cushions are each secured to the central disc portion at circumferentially spaced points so as to resist any tendency to pivot when subjected to the transmission of torsional load from the facings of the disc, and each cushion is, in addition, secured to a facing at preferably a plurality of points, so as to further resist such pivoting tendencies.

Furthermore, the central disc portion approaches fairly closely to the inner peripheries of the facings, and the points of attachment between the cushion pads and the disc portion are fairly close to the periphery of the disc portion, so as to reduce to a minimum the length of the reduced neck regions connecting the cushions proper to the cushion tabs, and to correspondingly reduce the leverage tending to twist or bend said neck regions under the torque load. As a result, the forces acting on the neck regions are largely shearing forces, which are adequately resisted by the neck regions. It will be understood that the reduced neck regions allow the circumferentially extended cushioning portions to freely flex during clutch engagement, without being hindered by the attachment to the unyielding disc portion of the plate.

In Fig. 4 I have illustrated a modification of the construction of the cushions illustrated in Fig. 1. In this figure the cushions 8e and 8f are constructed identically as to profile to the cushions 8 and 8d, but the bowed portions of each cooperating pair of cushions are formed so that one portion 12a is bowed to a lesser extent than is the opposite bowed portion 12b, and the bowed portion 12a of one of the cushions of each pair is in register with the bowed portion 12b of the opposite cushion of each pair. The rivets 13 and 14 serve to connect the facings 6 and 7 respectively, to the bowed cushion portions 12a and 12b without axial distortion of said facings. This arrangement provides a definite two-stage cushion action during initial compression of the clutch plate. As the plate is first compressed, the facings 6 and 7, which are engaged with the portions 12b only of each of the cushions, are resisted in their movement relatively toward one another and to the plane of the body of the disc 4 by one-half of each of the cushion members, but upon further compression, each of the facings may engage with the portions 12a of the cushions, thus to substantially double the resistance offered by the cushions. This change in resistance takes place at a definite stage in relative facing movement and provides a comparaticely light cushion resistance for initial, or "slip clutch engagement," and the desired increase in cushion resistance during the stage just prior to and at full clutch engagement.

In the clutch plate assembly shown in Figs. 1 to 3, and in Fig. 4, respectively, the series of cushions connected with the respective friction facings are engaged during the application of clutch packing pressure, so that the flexible end portions of the T-shaped cushions bend along lines generally coinciding with the sides of the flat regions 11 to permit relative axial movement of the friction facings toward each other.

While certain embodiments of the invention have been illustrated and described herein, by way of operative examples, it will be understood that the principles of the invention can be embodied in clutch plate assemblies substantially differing in details of construction and arrangement from those disclosed herein, without departing from the spirit of the invention or the scope of the annexed claims.

I claim:

1. A friction clutch comprising a pair of axially spaced friction facings, and a plurality of spring metal cushions, each of said spring metal cushions including a central region and a wing portion extending circumferentially on each side of said central region, said wing portions being bowed in a generally circumferential direction, said cushions being arranged in registering pairs and disposed with their central regions in opposition and the concave sides of their wing portions facing in opposite directions, certain of said cushions being in engagement with and attached to only one of said friction facings and other cushions being in engagement with and attached to only the other of said friction facings, said certain cushions and said other cushions being yieldably engageable with each other to resist axial movement of the friction facings in relation to each other under clutch packing pressure.

2. A friction clutch comprising a pair of axially spaced friction facings, and a plurality of spring metal cushions, each of said spring metal cushions including a central region and a bowed wing portion extending circumferentially on each side of said central region, said cushions being arranged in registering pairs and disposed with their central regions in abutment and the concave sides of their wing portions facing each other, so that the convex sides of the wing portions of each cushion are in engagement with only one of said facings, and means attaching one wing of the diagonally opposite wing portions of each pair to the facing in engagement therewith, the cushions of each registering pair being yieldingly engageable with each other to resist axial movement of the friction facings in relation to each other under clutch packing pressure.

3. A friction clutch plate comprising a non-yielding substantially circular disc, hub means for mounting said disc upon a shaft, spaced apart friction facings in parallel relationship to one another and to the plane of the body of the disc, said friction facings being located radially outwardly of the periphery of said disc, and a plurality of yieldable cushions of high torque transmitting strength but of materially lower weight per unit area than that of said disc, disposed between said facings in annular array about the axis of said disc, each of said cushions having an inwardly extending portion firmly secured at its radially inward extremity to said disc, and each cushion being secured to at least one of said facings, each of said cushions including a central region and a wing portion extending circumferentially on each side of said central region, said wing portions being bowed in a generally circumferential direction, said cushions being arranged in registering pairs, the cushions of each pair being disposed with their central regions in abutment and the concave sides of their wing portions facing each other, one of the facing wing portions being bowed to a greater extent than the other, one of the cushions of each pair being secured to only one of said facings and the other cushion of each pair being secured only to the other of said facings, the wing portions of the cushions of each pair being engageable with each other yieldably to resist movement of the facings toward one another in a plurality of stages during the application of clutch packing pressure.

4. A clutch plate assembly, including: a central hub; an annular mounting member carried by said hub in concentric relation to the axis of said hub; a pair of axially spaced annular friction facings disposed radially outwardly of the periphery of said mounting member; means for supporting one of said friction facings in torque transmitting relation to said mounting member and adapting said one friction facing for axial movement relative to the other friction facing, said supporting means including a plurality of independent resilient structures extending in a generally radially outward direction from said annular mounting member and between said friction facings, and attached to said one friction facing, each of said radially disposed resilient structures being particularly characterized by a foot portion overlying and secured to said annular mounting member, a cushion portion disposed beyond the periphery of said mounting member and being adapted to flex under clutch packing pressure, and an intermediate portion of substantially less circumferential width than either said foot portion or said cushion portion; and other supporting means engageable with the cushion portions of said first-mentioned supporting means under clutch packing pressure, said other supporting means being attached to said other friction facing and to said annular mounting member, said two supporting means being so arranged in relation to said friction facings, respectively, as to maintain said friction facings in substantially parallel relation to each other so as to enable both said friction facings to function uniformly throughout their operating surfaces under clutch packing pressure.

5. A friction clutch plate comprising a central mounting means; a pair of axially spaced annular friction facings disposed radially outward from the periphery of said mounting means; means for connecting one of said friction facings in torque transmitting relation to said mounting means and including a series of circumferentially spaced, individual sheet metal friction-facing supports carried by said mounting means and extending in a generally radial direction and attached to one friction facing only, said supports being of a generally T-shape and having a circumferentially extending head portion disposed between said friction facings, said head portion having flexible end regions; and other friction-facing supporting means carried by said mounting means and connected only to said other friction facing and engageable with said flexible end regions of said first-mentioned supports to effect flexing of said end regions yieldingly to resist axial movement of at least one friction facing toward the other friction facing under clutch packing pressure, said series of supports and said other supporting means, respectively, being so constructed and arranged relative to their associated friction facing as to maintain said associated friction facing free from axial distortion.

6. A friction clutch plate comprising a central mounting assembly; a pair of axially spaced annular friction facings disposed radially outward from the periphery of said mounting assembly; means for connecting one of said friction facings in torque transmitting relation to said mounting assembly and including a plurality of circumferentially spaced, independent, sheet metal supporting structures each connected to said mounting assembly and extending in a generally radially outward direction therefrom with portions lying between said friction facings, each said supporting structure being of a generally T-shape and having a flat radially extending region between said facings with circumferentially extending flexible portions at the sides of said flat region and in a plane offset from the plane of said flat region; means attaching each of said supporting structures to said one friction facing; and other supporting means carried by said mounting assembly and connected to said other friction facing and disposed in a plane other than the plane of said flexible portions for engagement therewith to effect flexing of said flexible portions yieldingly to resist axial movement of one of said friction facings towards the other friction facing under clutch packing pressure.

7. A friction clutch plate as defined in claim 6, in which the flexible portions bend along lines generally coinciding with the sides of the flat region.

DAVID E. GAMBLE.

REFERENCES CITED

The following references are of record in the file of this patent:

UNITED STATES PATENTS

| Number | Name | Date |
| --- | --- | --- |
| 1,541,883 | Wemp | June 16, 1925 |
| 1,945,382 | Saks | Jan. 30, 1934 |
| 1,992,626 | Nutt | Feb. 26, 1935 |
| 2,027,650 | Nutt | Jan. 14, 1936 |
| 2,037,928 | Saks | Apr. 21, 1936 |
| 2,324,913 | Daukus | July 20, 1943 |

FOREIGN PATENTS

| Number | Country | Date |
| --- | --- | --- |
| 388,704 | Great Britain | 1933 |
| 794,147 | France | 1936 |